(12) United States Patent
Ford

(10) Patent No.: US 12,241,495 B2
(45) Date of Patent: Mar. 4, 2025

(54) THREADED FASTENER

(71) Applicant: Amsted Rail Company, Inc., Chicago, IL (US)

(72) Inventor: Brian C. Ford, Moseley, VA (US)

(73) Assignee: Amsted Rail Company, Inc., Chicago, IL (US)

(*) Notice: Subject to any disclaimer, the term of this patent is extended or adjusted under 35 U.S.C. 154(b) by 196 days.

(21) Appl. No.: 17/406,000

(22) Filed: Aug. 18, 2021

(65) Prior Publication Data

US 2023/0060078 A1 Feb. 23, 2023

(51) Int. Cl.
*F16B 39/06* (2006.01)
*F16B 37/04* (2006.01)

(52) U.S. Cl.
CPC ............ *F16B 37/041* (2013.01); *F16B 39/06* (2013.01)

(58) Field of Classification Search
CPC ........ F16B 37/041; F16B 39/06; F16B 39/32; F16B 39/10; Y10T 403/592
USPC .......................... 411/322, 327, 326, 949, 950
See application file for complete search history.

(56) References Cited

U.S. PATENT DOCUMENTS

| | | | | |
|---|---|---|---|---|
| 127,320 A * | 5/1872 | Dinsmore | ................ | F16B 39/32 411/207 |
| 575,268 A * | 1/1897 | Nicodemus | ............. | F16B 39/32 411/327 |
| 588,346 A * | 8/1897 | Malasky | ................. | F16B 39/32 81/10 |
| 737,044 A * | 8/1903 | Thorne | .................... | F16B 39/32 411/114 |
| 747,669 A * | 12/1903 | Wenner | .................... | F16B 39/32 411/328 |
| 922,482 A * | 5/1909 | Jacobs | .................... | F16B 39/32 411/941 |
| 1,003,804 A * | 9/1911 | Rosser | .................... | F16B 39/32 411/327 |

(Continued)

FOREIGN PATENT DOCUMENTS

DE 102009023002 A1 * 12/2010 ............. F16B 31/02
GB 105640 A 4/1917

(Continued)

OTHER PUBLICATIONS

PCT/US2022/040585 International Search Report and Written Opinion dated Nov. 15, 2022, 10 pages.

*Primary Examiner* — Christine M Mills
*Assistant Examiner* — Dil K. Magar
(74) *Attorney, Agent, or Firm* — COZEN O'CONNOR

(57) ABSTRACT

A threaded fastener includes a nut forming a threaded center hole that defines a rotational axis. The threaded fastener also includes a plurality of spring plungers affixed to the nut, each having a shaft that is aligned parallel to the rotational axis. The threaded fastener also includes a positioner forming (i) an unthreaded center hole that is coaxial with the threaded center hole and (ii) a plurality of recesses facing the spring plungers. As the nut is torqued against the positioner on a threaded spindle, the spring plungers repeatedly engage and disengage the recesses as the nut rotates with respect to the positioner. The recesses are shaped such that positioner converts the applied torque into a linear force that compresses the spring plungers, thereby locking the threads of the nut against the threads of the spindle.

21 Claims, 10 Drawing Sheets

(56) References Cited

U.S. PATENT DOCUMENTS

| | | | | | |
|---|---|---|---|---|---|
| 1,193,370 | A | * | 8/1916 | Duffy | F16B 39/32 411/327 |
| 1,211,553 | A | * | 1/1917 | Dervoz | F16B 39/06 411/949 |
| 1,213,097 | A | * | 1/1917 | Gottlob | F16B 39/32 411/941 |
| 1,220,129 | A | * | 3/1917 | Inglis | F16B 39/06 411/948 |
| 1,468,120 | A | * | 9/1923 | Malasky | F16B 39/10 411/327 |
| 1,477,509 | A | * | 12/1923 | Lowry | F16B 39/32 411/933 |
| 1,504,189 | A | * | 8/1924 | Rees | F16B 39/32 411/328 |
| 1,629,726 | A | * | 5/1927 | Morse | F16B 39/10 411/953 |
| 1,879,290 | A | * | 9/1932 | Johnson | F16B 39/06 411/948 |
| 1,954,114 | A | * | 4/1934 | Young | F16B 39/32 411/941 |
| 2,179,169 | A | * | 11/1939 | Anderson | F16B 39/10 411/130 |
| 2,881,602 | A | * | 4/1959 | Baker | F16K 31/60 464/35 |
| 3,282,316 | A | * | 11/1966 | Griswold | F16B 39/32 411/964 |
| 4,735,533 | A | * | 4/1988 | Gallagher | F16K 35/00 411/119 |
| 5,013,197 | A | * | 5/1991 | Allaert | F16B 37/00 411/533 |
| 5,180,265 | A | | 1/1993 | Wiese | |
| 5,674,034 | A | * | 10/1997 | Bennett | F16B 39/10 411/197 |
| 5,897,277 | A | * | 4/1999 | Barre | F16B 39/282 411/327 |
| 7,811,038 | B2 | | 10/2010 | Jimenez | |
| 8,292,373 | B2 | | 10/2012 | Rieger et al. | |
| 8,403,611 | B2 | * | 3/2013 | Friesen | F16B 39/32 411/533 |
| 8,534,770 | B2 | | 9/2013 | White et al. | |
| 8,870,149 | B2 | * | 10/2014 | Rodig | B64D 47/00 403/322.2 |
| 9,062,705 | B2 | * | 6/2015 | Jimenez | F16B 41/002 |
| 9,746,019 | B2 | | 8/2017 | Oh et al. | |
| 10,323,676 | B2 | | 6/2019 | Hughes et al. | |
| 2003/0190212 | A1 | * | 10/2003 | Peterkort | F16B 39/10 411/119 |
| 2006/0029485 | A1 | * | 2/2006 | Weinstein | F16B 39/10 411/121 |
| 2010/0071782 | A1 | * | 3/2010 | Scheffel | F16B 21/125 411/327 |
| 2011/0014004 | A1 | * | 1/2011 | Yasui | F16B 39/02 411/1 |
| 2011/0027041 | A1 | * | 2/2011 | Friesen | F16B 39/26 411/313 |
| 2012/0061597 | A1 | * | 3/2012 | Speer | F16K 27/0236 251/89 |
| 2012/0074292 | A1 | * | 3/2012 | Schroder | B66C 23/78 248/677 |
| 2013/0055547 | A1 | * | 3/2013 | Dixon | F16B 39/06 29/525.02 |
| 2013/0239395 | A1 | * | 9/2013 | Schuster | F16B 39/04 411/209 |
| 2014/0314515 | A1 | * | 10/2014 | Baker | F16B 39/32 411/326 |
| 2017/0343135 | A1 | * | 11/2017 | Piotrowski | H02G 3/083 |
| 2018/0021845 | A1 | | 1/2018 | LeMieux | |
| 2018/0298937 | A1 | * | 10/2018 | Paul | B25B 21/005 |
| 2019/0249707 | A1 | * | 8/2019 | Kishida | F16B 39/284 |

FOREIGN PATENT DOCUMENTS

| | | | |
|---|---|---|---|
| GB | 532767 A | 1/1941 | |
| WO | WO 2002008617 A1 | 1/2002 | |
| WO | WO-2013070904 A1 * | 5/2013 | F16B 39/32 |

* cited by examiner

THREADED FASTENER

BACKGROUND

A nut is a piece of hardware that may be threaded onto an axle or spindle to secure a wheel. When installing, the correct torque should be applied to the nut to maximize bearing life and to ensure that the axle nut will not loosen over time.

SUMMARY

The present embodiments include a threaded fastener that may be used in any application that uses nuts and similar types of threaded fasteners. For example, the threaded fastener may be used as an axle nut to secure components on a threaded spindle. Advantageously, the threaded fastener may be constructed using readily available commercial components, and can easily lock into place to prevent movement of a wheel bearing. The threaded fastener is easily removable for service and unitized (i.e., has components that are physically connected to form a single part) to prevent components from separating and to prevent tampering with the threaded fastener, wheel bearing, or both.

In embodiments, a threaded fastener includes a nut forming a threaded center hole that defines a rotational axis of the threaded fastener. The threaded fastener also includes a plurality of spring plungers affixed to the nut, each having a shaft that is aligned parallel to the rotational axis. The threaded fastener also includes a positioner forming (i) an unthreaded center hole that is coaxial with the threaded center hole and (ii) a plurality of recesses facing the plurality of spring plungers. At least one of the plurality of spring plungers engages with a corresponding at least one of the plurality of recesses when the nut is tightened against the positioner on a threaded spindle.

DETAILED DESCRIPTION

Figure 1:
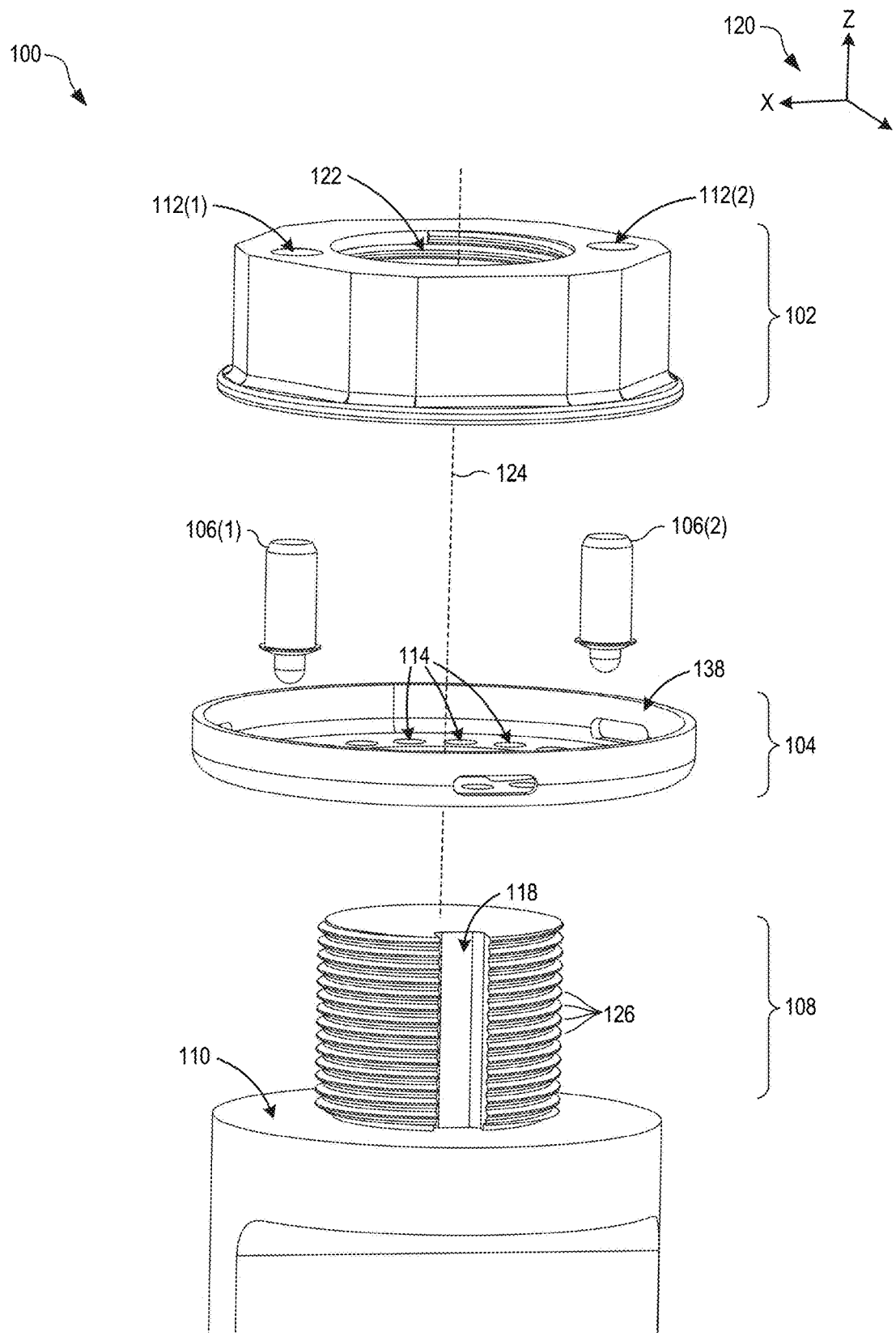
FIG. 1 is an exploded view of a threaded fastener that affixes to a threaded spindle, in an embodiment.

FIG. 1 is an exploded view of a threaded fastener 100 that affixes to a threaded spindle 108. The threaded fastener 100 includes a nut 102 forming a threaded central hole 122 that is threaded to match external threads 126 of the spindle 108. The threaded central hole 122 and spindle 108 are coaxial to a rotation axis 124 about which the nut 102 rotates, and along which the nut 102 linearly translates, or advances, to engage with the external threads 126 of the spindle 108. For clarity herein, it is assumed that the rotation axis 124 coincides with the z axis of a right-handed Cartesian coordinate system 120, wherein the nut 102 translates in the −z direction when engaging with the spindle 108, and in the +z direction when disengaging from the spindle 108.

Figure 2:
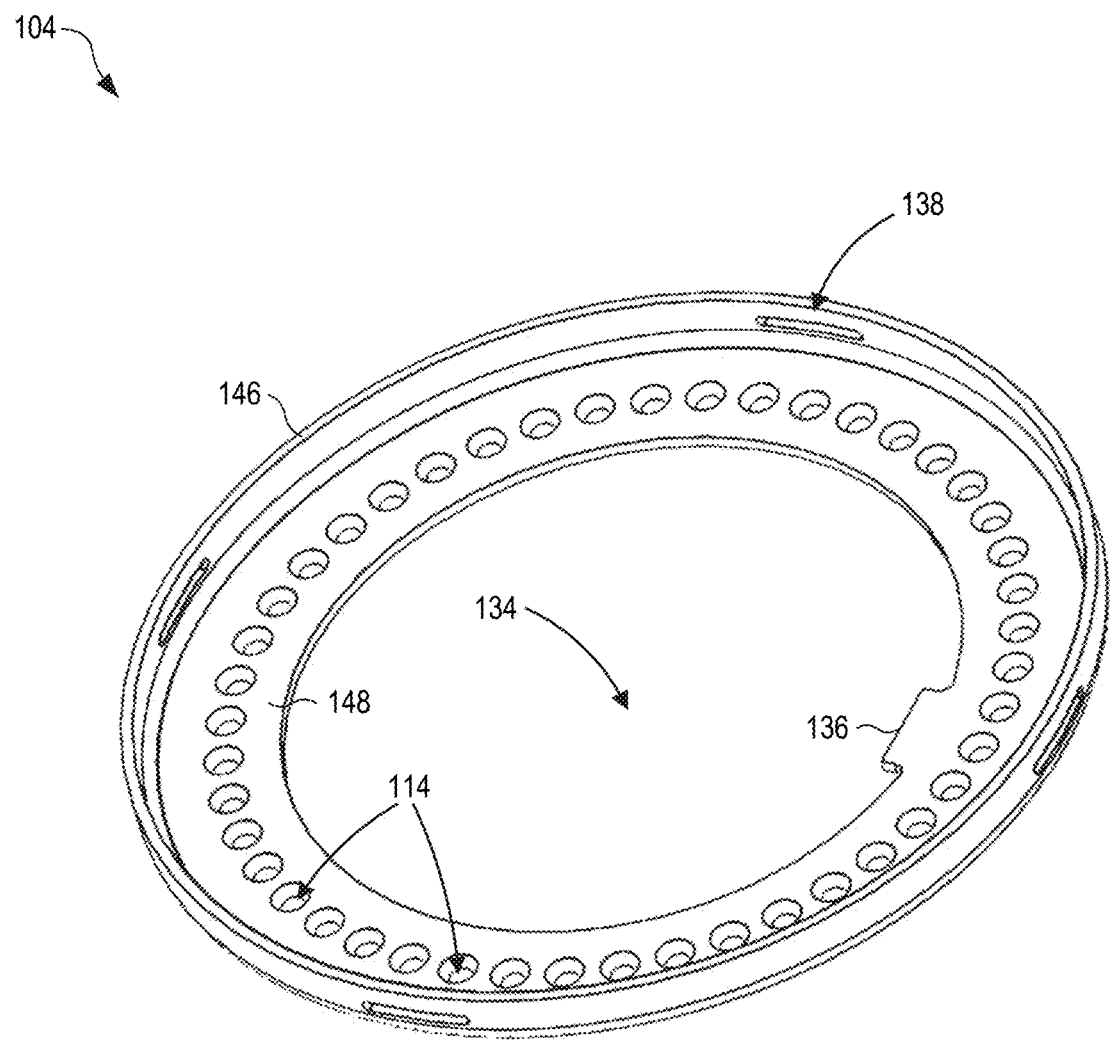
FIG. 2 is a perspective view of a positioner of the threaded fastener of FIG. 1, in an embodiment.

FIG. 2 is a perspective view of a positioner 104 of the threaded fastener 100. The positioner 104 is shaped as a disc 148 that lies flat in the x-y plane and forms an unthreaded central hole 134 through which the spindle 108 passes. The disc 148 also forms a sequence of recesses 114 located circumferentially around the unthreaded central hole 134. Extending axially upward (i.e., along the +z direction) from an outer edge of the disc 148 is a lip 146. As described in more detail below, the lip 146 forms a plurality of indentations 138 that can be pushed radially inward to unitize the threaded fastener 100.

In some embodiments, the disc 148 forms a tab 136 that extends radially inward to engage with a vertical slot 118 formed by the spindle 108. The tab 136 and slot 118 cooperatively prevent the positioner 104 from rotating about the rotation axis 124. It is assumed herein that the slot 118 is located in the +y direction relative the rotation axis 124. Thus, when the positioner 104 is engaged with the spindle 108, the tab 136 will be located in the slot 118, and therefore also located in the +y direction relative to the rotation axis 124.

Affixed to the nut 102 circumferentially around the threaded central hole 122 are a plurality of spring plungers 106 that engage with the recesses 114. The plungers 106 cooperate with the recesses 114 to create a detent mechanism that both arrests motion of the nut 102 while it is being tightened onto the spindle 108 and divides rotation of the nut 102 into discrete angular increments about the rotation axis 124. In FIG. 1, the nut 102 forms a first plunger mounting hole 112(1) and a second plunger mounting hole 112(2) that receive the first plunger 106(1) and the second plunger 106(2), respectively. However, the threaded fastener 100 may have only one plunger 106, or more than two plungers 106 (and corresponding plunger mounting holes 112) without departing from the scope hereof.

As shown in FIG. 1, the nut 102 may be transversely (i.e., in the x-y plane) shaped as a truncated hexagon (i.e., a hexagon with each of its corners truncated to form an irregular twelve-sided polygon). Alternatively, the nut 102 may be transversely shaped as an untruncated regular hexagon, or another kind of regular or irregular polygon. Each of the spring plungers 106 may be positioned near a corner of the polygon, where there is generally more material to form a plunger mounting hole 112, as compared to regions away from the corners.

One advantage of the threaded fastener 100 is that all of the plunger mounting holes 112 can be drilled into one axial end of the nut 102. Thus, the nut 102 only needs to be mounted one time to a fixture (e.g., a vise) for drilling all of the plunger mounting holes 112. Alternatively, the nut 102 can be made from a process such as metal injection molding (MIM). Since the plunger mounting holes 112 have axes that are parallel to each other (and parallel to the rotation axis 124), the nut 102 can be pulled off of the MIM tooling in a single direction, drastically reducing manufacturing complexity. By contrast, plunger mounting holes drilled radially through the nut 102 would require the nut 102 to be rotated and remounted for each hole. Similarly, all of the recesses 114 can be advantageously drilled into one side of the disc 148 of the positioner 104.

Figure 3:
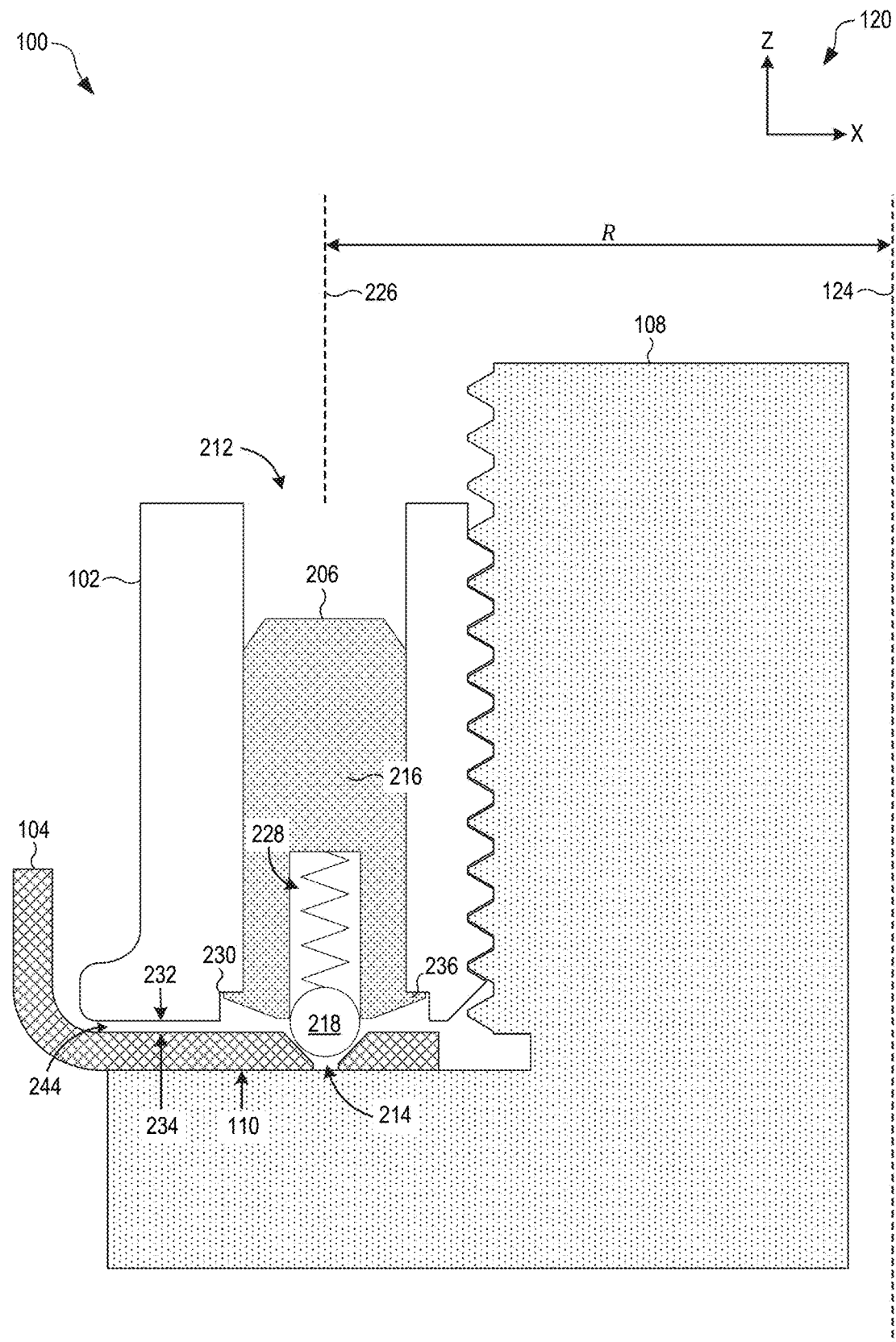
FIG. 3 is a cross-sectional view of the threaded fastener of FIG. 1 showing a contact engaged with a recess, in an embodiment.
Figure 4:
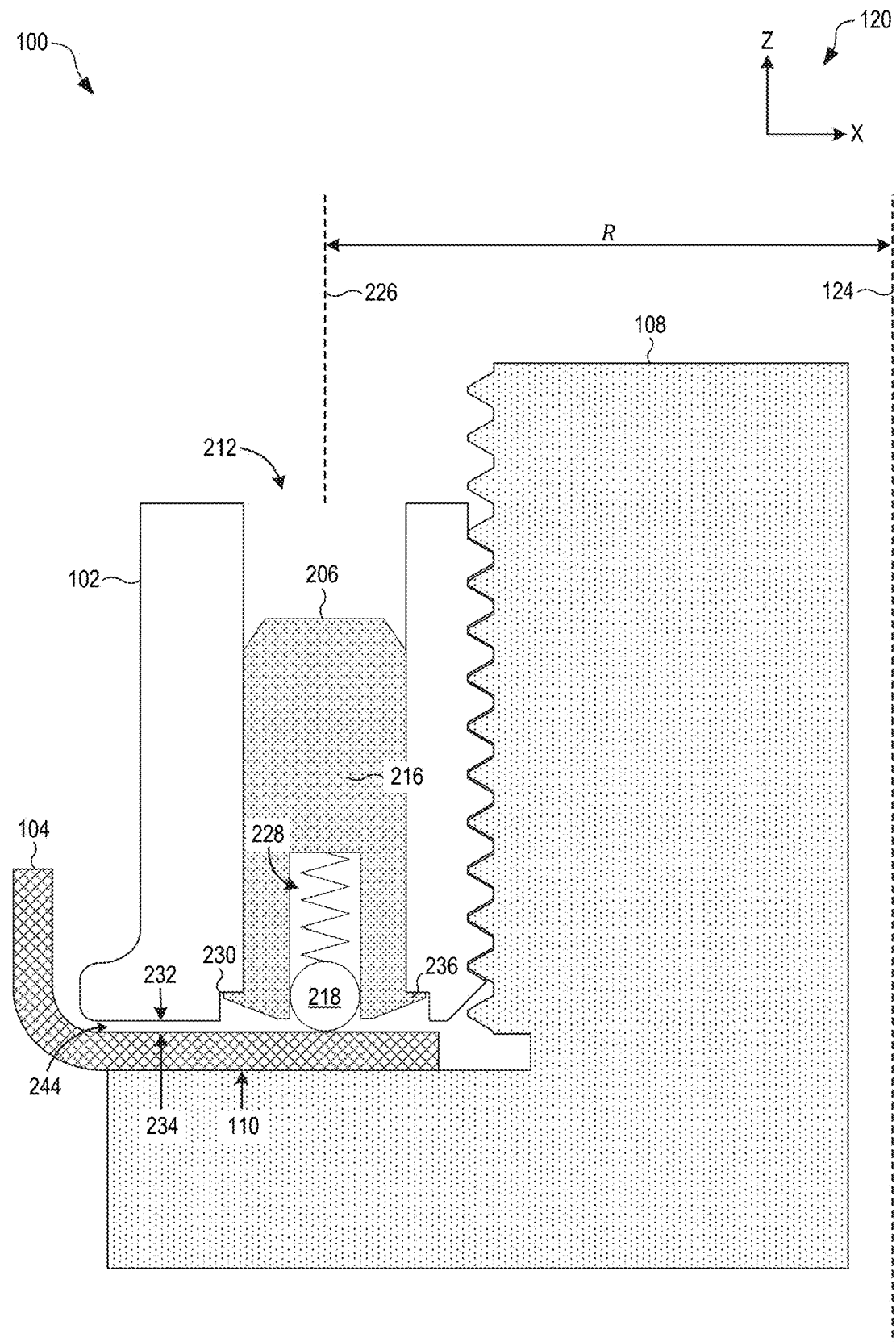
FIG. 4 is a cross-sectional view of the threaded fastener of FIG. 1 showing the contact not engaged with the recess.

FIGS. 3 and 4 are cross-sectional views of the fastener 100 when threaded onto the spindle 108. FIGS. 3 and 4 depict operation of the fastener 100 after it has been advanced along the spindle 108 such that the positioner 104 contacts an end face 110 of the spindle 108, i.e., the axial position of the positioner 104 is fixed by the end face 110. A bottom face 232 of the nut 102 is axially separated (i.e., along the z direction) from a top face 234 of the positioner 104 by a gap 244. The nut 102 may be torqued (e.g., by a wrench) to either tighten or loosen the fastener 100. When the fastener 100 is tightened, the nut 102 advances toward the positioner 104 (i.e., in the −z direction), thereby reducing the gap 244. The fastener 100 may be tightened to a predetermined torque level (e.g., by a torque wrench) or such that it "bottoms out" when the bottom face 232 directly contacts the top face 234. Conversely, when the fastener 100 is loosened, the nut 102 advances away from the positioner 104 (i.e., in the +z direction), thereby increasing the gap 244. For clarity, the wrench used to torque the nut 102 is not shown in FIGS. 3 and 4. FIGS. 3 and 4 are best viewed together with the following description.

The cross-sectional views of FIGS. 3 and 4 are taken through the rotation axis 124 and a plunger 206 which may be any one of the plungers 106 in FIG. 1. The plunger 206 has a cylindrical shaft 216 with a plunger axis 226 that is parallel to the rotation axis 124 and transversely displaced from the rotation axis 124 (i.e., in the x-y plane) by a radial distance R. The plunger 206 is inserted into a plunger mounting hole 212 which may be any one of the plunger mounting holes 112 in FIG. 1. The plunger mounting hole 212 may be a straight unthreaded through-hole or blind hole into which the plunger 106 is inserted and affixed via an interference fit. Alternatively, the plunger 106 may be inserted into the plunger mounting hole 212 and affixed thereto via epoxy. Alternatively, the plunger mounting hole 212 may be threaded to accept external threads of the cylindrical shaft 216, in which case the plunger 206 is threaded into the plunger mounting hole 212. The plunger 106 may inserted into, and affixed to, the plunger mounting hole 212 using another mounting mechanism without departing from the scope hereof.

The plunger 206 also has a contact 218 affixed to the bottom of a spring 228 that extends and compresses along the plunger axis (i.e., the z direction). The top of the spring 228 is fixed to the shaft 216, and therefore the spring 228 exerts an axial force against the contact 218, thereby pushing the contact 218 downward. The contact 218 is shaped to engage with each of the recesses 114 when positioned thereover. For example, in FIGS. 3 and 4 the contact 218 is shaped as a sphere (e.g., a ball bearing). Alternatively, the contact 218 may be a pin with a curved bottom face (e.g., a bullnose). Without departing from the scope hereof, the contact 218 may be another type of mechanism that is actuated via the spring 228 to engage with the recesses 114.

FIG. 3 shows the contact 218 engaged with a recess 214, which may be any one of the recesses 114 of FIGS. 1 and 2. In FIG. 3, the contact 218 extends downward (i.e., in the negative z direction) below the top face 234 of the positioner 104 to at least partially enter the recess 214. In the example of FIG. 3, the recess 214 is a countersunk hole formed downward from the top face 234 and shaped as an inverted truncated right circular cone. The countersink angle, or apex angle, of the cone may be 82°, 90°, 100°, or another value between 0° and 180°. While FIG. 3 shows the recess 214 as a through hole, the recess 214 may alternatively be a blind hole. In this case, the recess 214 may be shaped as an untruncated right circular cone. Alternatively, the recess 214 may be a straight through hole or blind hole, or a counterbored hole. However, the recess 214 may have a different shape than shown herein and need not be cylindrical or conical.

FIG. 4 shows the contact 218 not engaged with the recess 214. In this case, the spring 228 exerts an axially downward force that pushes the contact 218 directly against the top face 234 of the positioner 104. As compared to FIG. 3, the spring 228 in FIG. 4 is more compressed, and therefore exerts a greater downward force on the contact 218. Once the positioner 104 contacts the end face 110 of the threaded spindle 108, and the nut 102 is further torqued about the rotation axis 124, the contact 218 will slide across the top face 234 until it encounters, and extends downward to enter, the next recess of the sequence.

As shown in FIGS. 3 and 4, the plunger mounting hole 212 may form a counterbore extending upward from the bottom face 232 of the nut 102 to create an internal shoulder 230. A depth of the counterbore in the +z direction may be selected to accommodate a flange 236 of the plunger 206 that, when pushed upwards against the shoulder 230, establishes the vertical position of the plunger 206, and thus the contact 218, relative to the bottom face 232. However, another mechanism may be used to vertically position the plunger 206 without departing from the scope hereof. For example, if the plunger mounting hole 212 is a blind hole formed upward from the bottom face 232, then the depth of this blind hole may be selected to vertically locate the plunger 206, and thus the contact 218, relative to the bottom face 232.

Figure 5:
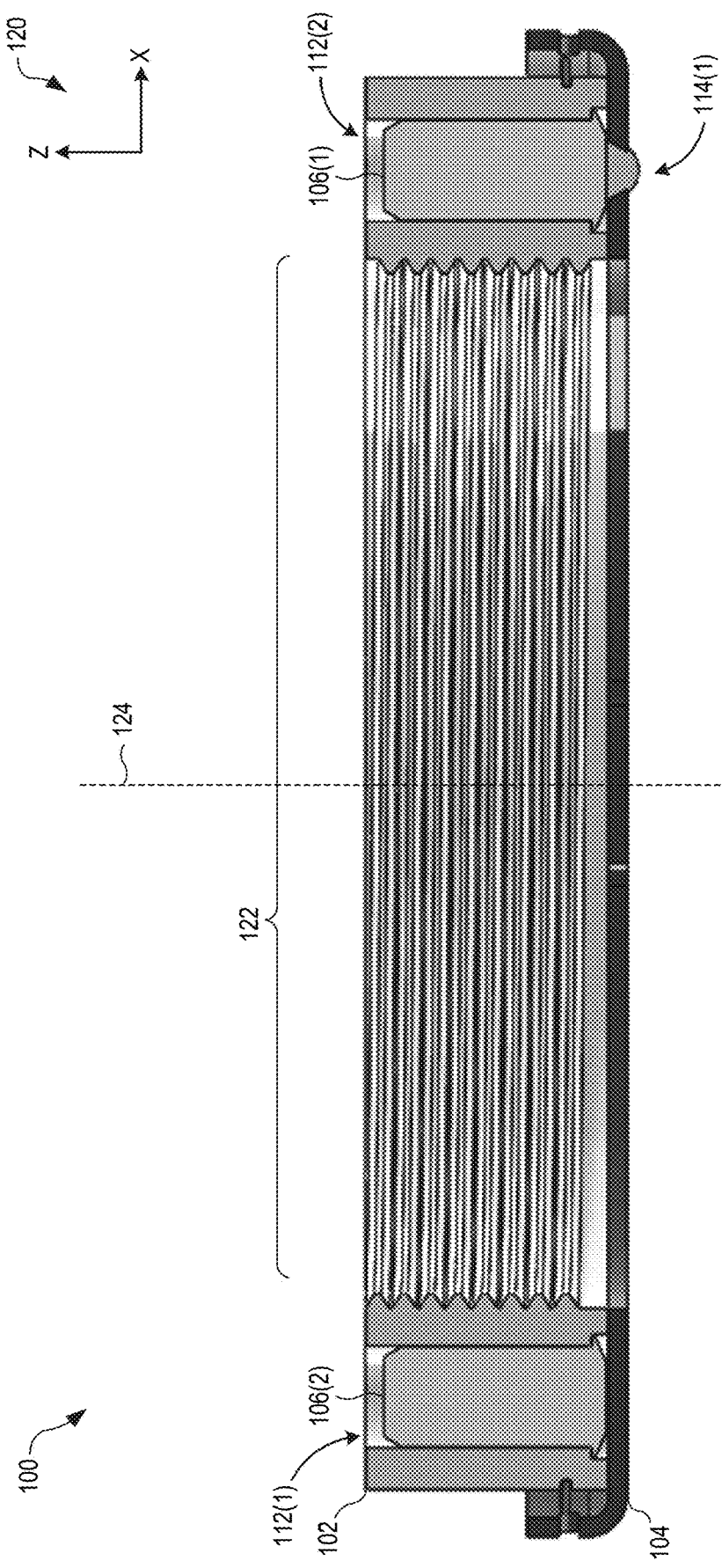
FIG. 5 is a side cutaway view of the threaded fastener of FIG. 1, in an embodiment.

FIG. 5 is a side cutaway view of the threaded fastener 100 of FIG. 1. For clarity in FIG. 5, the spindle 108 is not shown, thereby showing internal threads of the threaded central hole 122. In FIG. 5, the first plunger 106(1) is engaged with a first recess 114(1) while the second plunger 106(2) is not engaged with any of the recesses 114. Thus, in this embodiment the recesses 114 and plungers 106(1) and 106(2) are positioned azimuthally about the rotation axis 124 such that only one of the plungers 106(1) and 106(2), at most, is engaged with one of the recesses 114, regardless of the rotational angle of the nut 102.

Figure 6:
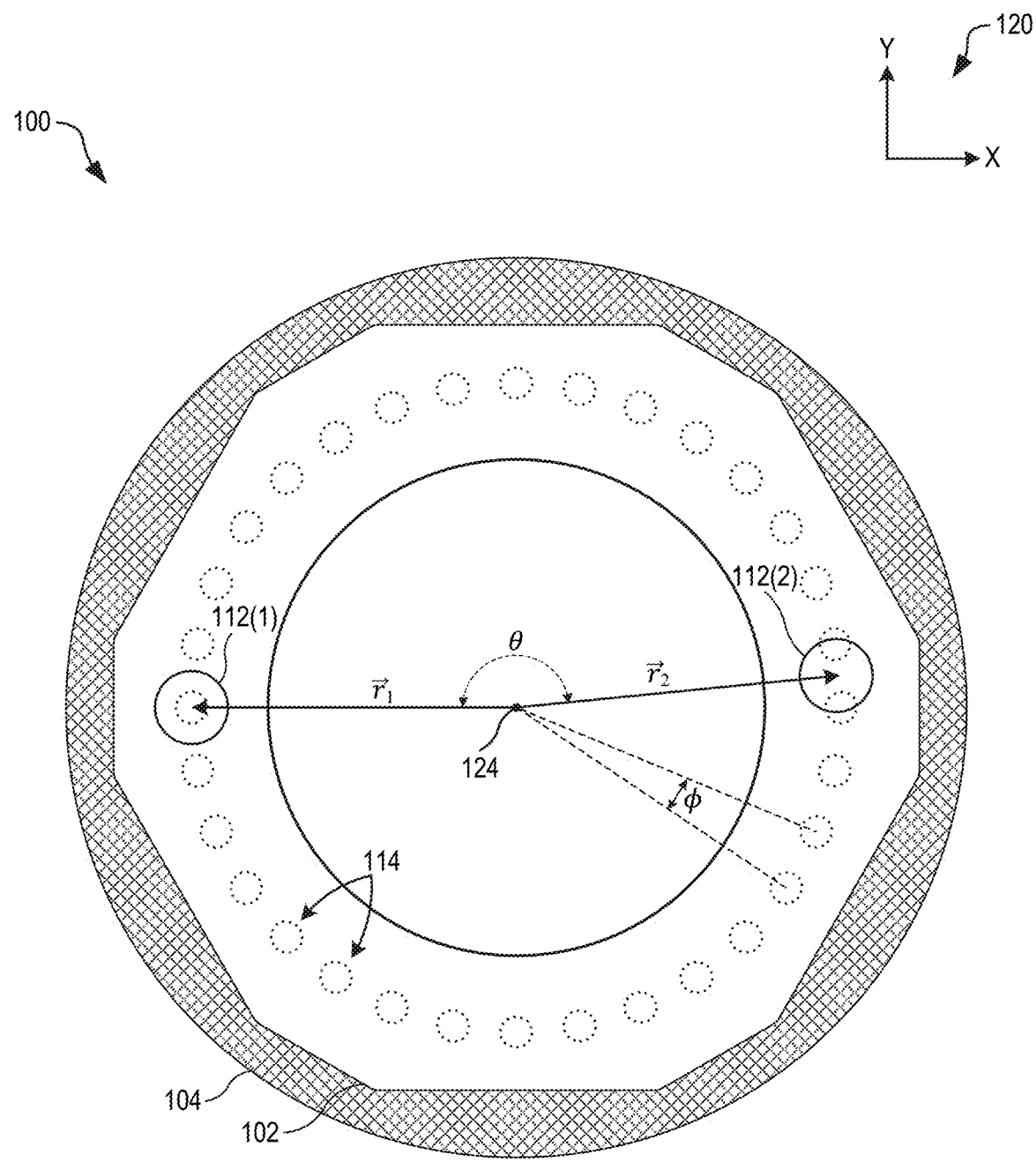
FIG. 6 is a top view of the threaded fastener of FIG. 1 illustrating azimuthal positioning of plungers about a rotation axis, in an embodiment.

FIG. 6 is a top view of the threaded fastener 100 of FIG. 1 illustrating azimuthal positioning of the plungers 106(1) and 106(2) about the rotation axis 124. In FIG. 6, the center of the first plunger mounting hole 112(1) is defined by a first radial vector $\vec{r}_1$ lying in the transverse x-y plane with the rotation axis 124 as the origin. Similarly, the center of the second plunger mounting hole 112(2) is defined by a second radial vector $\vec{r}_2$. Both of the plunger mounting holes 112(1) and 112(2) are centered at the radial distance R from the rotation axis 124, i.e., $|\vec{r}_1|=|\vec{r}_2|=R$. However, the azimuthal angle θ in the transverse x-y plane between the radial vectors $\vec{r}_1$ and $\vec{r}_2$ is not 180°. Specifically, the first plunger mounting hole 112(1) is centered over one of the recesses 114 such the first plunger 106(1) will engage with said one of the recesses 114. However, the second plunger mounting hole 112(2) is located between two of the recesses 114 such that the second plunger 106(2) will not engage with any of the recesses 114. Thus, the plunger mounting holes 112(1) and 112(2) are azimuthally positioned about the rotation axis 124 such that only one of the plungers 106(1) and 106(2), at most, engages with one of the recesses 114.

The positioner 104 forms N recesses 114 that are uniformly spaced about the rotation axis 124 by a recess angular increment ϕ=360°/N. Thus, the recesses 114 have a N-fold rotational symmetry about the rotation axis 124. In the example of FIG. 6, N=32, and therefore the recess angular increment is ϕ=360°/32=11.25°. However, N may be a different value without departing from the scope hereof. In FIG. 6, the second plunger mounting hole 112(2) is located halfway between two of the recesses 114. As the nut 102 rotates about the rotation axis 124, the plungers 106(1) and 106(2) alternatingly engage with the recesses 114 to produce a series of audible "clicks". The first plunger 106(1) produces one click when the nut 102 is rotated by ϕ. The second plunger 106(2) also produces one click when the nut 102 is rotated by ϕ. However, the clicks generated by the plungers 106(1) and 106(2) will be interleaved such that rotation of the nut 102 by ϕ/2 produces one click. Thus, FIG. 6 shows how two plungers 106 can be used to produce clicks at one-half the angular increment ϕ. This concept may be extended to more than two plungers 106 to produce clicks at even smaller fractions of the angular increment ϕ. For example, when the threaded fastener 100 has three plungers 106, these three plungers 106 may be azimuthally positioned such that rotation of the nut 102 by ϕ/3 produces one click. More generally, when the threaded fastener 100 includes p plungers 106, where p is any integer greater than or equal to 1, the p plungers 106 may be azimuthally positioned such that rotation of the nut 102 by ϕ/p produces one click.

In the example of FIG. 6, the azimuthal angle θ is 174.375°. However, the plunger mounting holes 112(1) and 112(2) may be alternatively positioned to form a different azimuthal angle θ such that the second plunger 106(2) is positioned between a different pair of neighboring recesses 114 when the first plunger 106(1) engages with one of the recesses 114. In another embodiment, the azimuthal angle θ is 180° and the number of recesses 114 is odd. In this case, no two of the recesses 114 are azimuthally separated by 180°, thereby ensuring that the plungers 106(1) and 106(2) do not simultaneously engage with two of the recesses 114.

In other embodiments, the threaded fastener 100 includes a plurality of plungers 106 that are uniformly spaced, azimuthally about the rotation axis 124, by a plunger angular spacing. The plurality of recesses 114 may also be uniformly spaced, azimuthally about the rotation axis 124, by a recess angular spacing. When the plunger angular spacing is not an integer multiple of the recess angular spacing, only one of the more than two plungers 106, at most, will engage with one of the recesses 114 as the nut 102 rotates. This condition is equivalent to the number of recesses 114 not being an integer multiple of the number of plungers 106.

Those skilled in the art will recognize that the torque needed to disengage a plunger 106 from a recess 114 will quantitatively depend on the size and geometry of each recess 114 (e.g., the diameter, depth, and countersink angle), the size and geometry of each contact 218 (e.g., the diameter of the sphere ball bearing), the radial distance R, and the spring constant of each spring 228. Accordingly, one or more of these parameters may be selected to achieve a predetermined torque. Note that when selecting these parameters, it may be assumed that when the contact 218 is fully engaged with a recess 114, that the spring 228 is still compressed relative to its free length, and that the spring 228 therefore still exerts a non-zero downward axial force on the contact 218. Furthermore, while the above examples show only one plunger 106 engaged with a recess 114, the threaded fastener 100 may be designed such that two or more plungers 106 simultaneously engage with two or more recesses 114. Each of the two or more plungers 106 may be centered at the same radial distance R from the rotation axis 124. In this case, the torque and energy required to disengage the two or more plungers 106 scales with the number of plungers 106 that are simultaneously engaged with the recesses 114.

Figure 7:
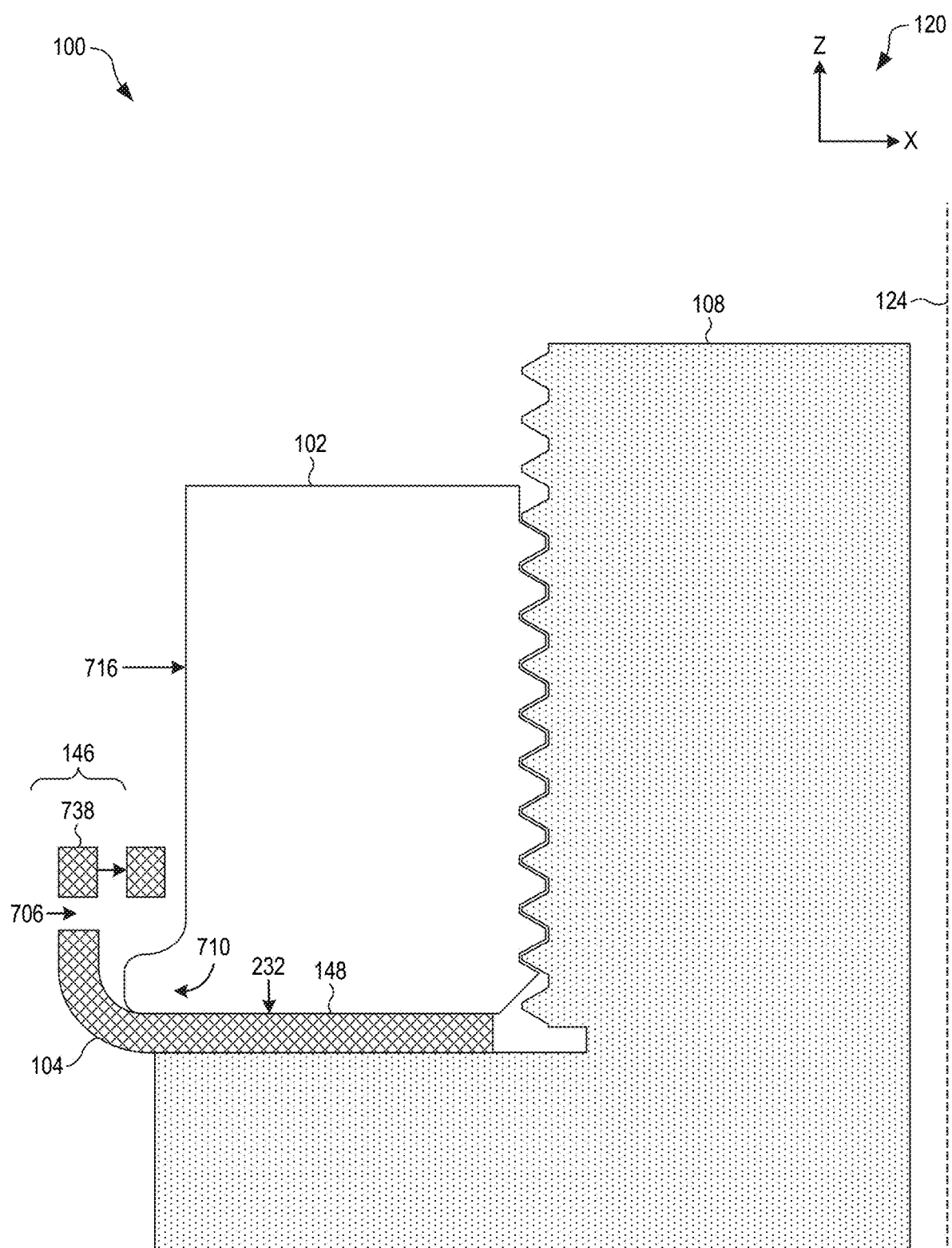
FIG. 7 is a cross-sectional view of the threaded fastener of FIG. 1 showing an indentation cooperating with a retaining ring to axially constrain the positioner, in an embodiment.

FIG. 7 is a cross-sectional view of the threaded fastener 100 showing an indentation 738 cooperating with a retaining ring 710 to axially (i.e., along the z direction) constrain the positioner 104 relative to the nut 102. The indentation 738 may be any of the indentations 138 shown in FIGS. 1 and 2. In FIG. 7, the retaining ring 710 is a flange that continuously encircles the nut 102 about the rotation axis 124 and is integrally formed with the nut 102. The flange extends radially outward from outward-facing surfaces 716 of the nut 102, and is located toward the bottom face 232 of the nut 102. The innermost radius of the lip 146 is greater than a maximum radius of the flange so that the indentation 738 may be pushed radially inward (i.e., toward the rotation axis 124) to cover the flange. To create the indentation 738, a slit 706 may be machined or otherwise formed in the lip 146 of the positioner 104. Alternatively, the top portion of the lip 146 may be crimped over the flange, either continuously around the rotation axis 124 or at a discrete number of locations about the rotation axis 124.

While FIG. 7 shows only one indentation 738, it should be understood from FIGS. 1 and 2 that the positioner 104 forms a plurality of indentations 138 about the rotation axis 124. For example, FIG. 1 shows the positioner 104 with three indentations 138 while FIG. 2 shows the positioner 104 with four indentations 138. The positioner 104 may form a different number of indentations 138 without departing from the scope hereof. Regardless of number, when all of the indentations 138 are pushed radially inward to cover the retaining ring 710, the retaining ring 710 is axially constrained between the disc 148 and the indentations 138, and thus the nut 102 and positioner 104 are unitized. The term "unitized" means that the nut 102 cannot be separated from the positioner 104, however the nut 102 can still freely rotate with respect to the positioner 104. Here, "freely rotate" means that the retaining ring 710 does not force the positioner 104 against the plungers 106(1) and 106(2) (i.e., the plungers 106(1) and 106(2) are not pre-loaded by the positioner 104).

Figure 8:
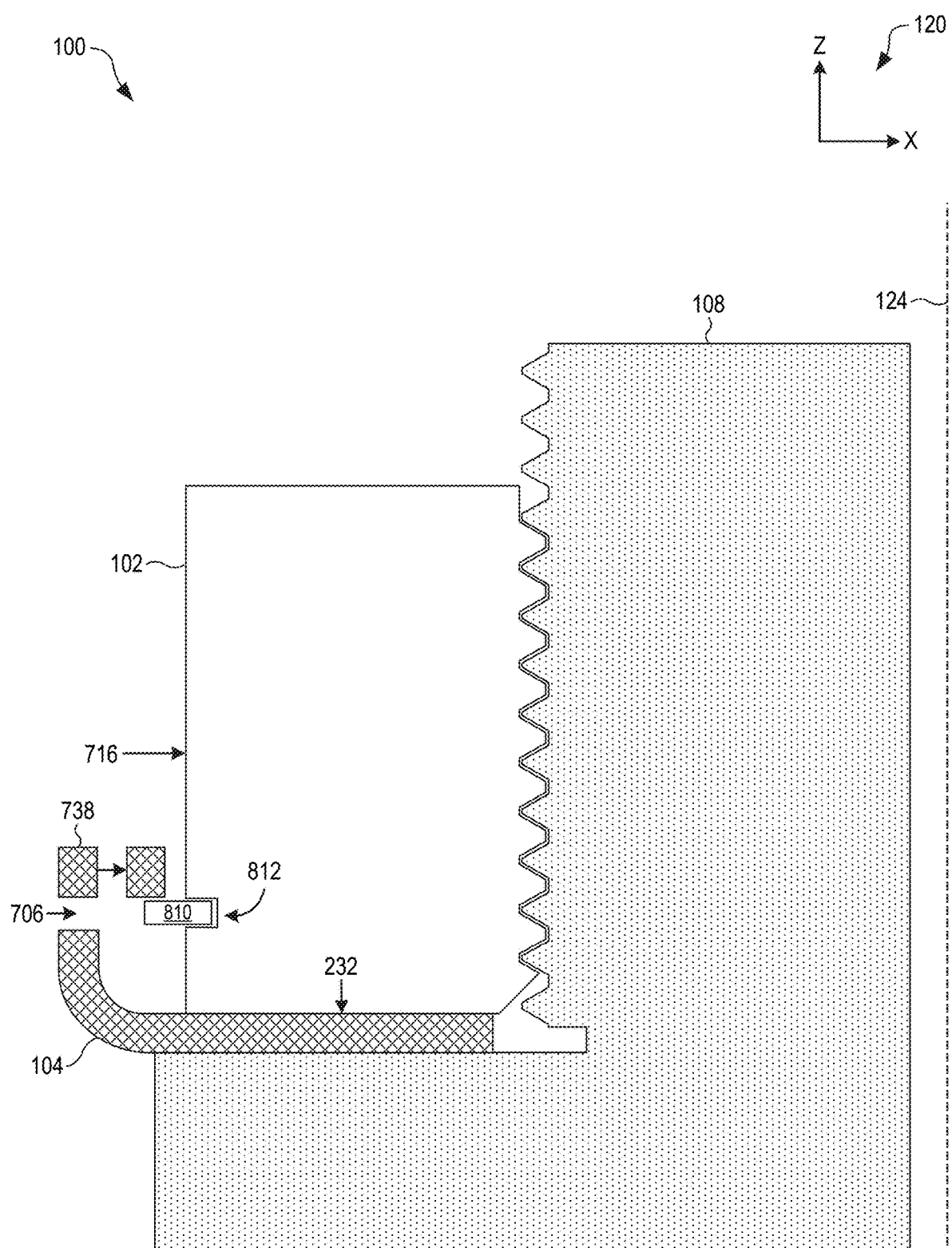
FIG. 8 is a cross-sectional view showing the threaded fastener of FIG. 1 with another embodiment of the retaining ring.

FIG. 8 is a cross-sectional view that shows the threaded fastener 100 with another embodiment of the retaining ring 710. In this case, the retaining ring 710 is an annulus 810 that continuously encircles the nut 102 about the rotation axis 124 and is not physically integral with the nut 102. The annulus 810 may be pushed axially downward (i.e., in the −z direction) from the top of the nut 102, or axially upward (i.e., in the +z direction) from the bottom face 232 of the nut 102, to engage with a notch 812 that is formed in the outward-facing surface 716 of the nut 102. The axial position of the notch 812 is selected such that the indentation 738, when pushed radially inward, covers the annulus 810 from above, thereby unitizing the nut 102 with the positioner 104. To accommodate the indentations 138 shown in FIGS. 1 and 2, several notches 812 may be formed in several outward-facing surface 716 of the nut 102. When the nut 102 is transversely shaped as a polygon (e.g., a hexagon), a notch 812 may be formed in each corner of the polygon.

Advantageously, unitization prevents tampering of the threaded fastener 100. Unitization also prevents components of the threaded fastener 100 from being accidently lost. However, the threaded fastener 100 need not be unitized, in which case the retaining ring 710 may be excluded. Accordingly, one of the present embodiments includes only the nut 102 and plungers 112, in which case the positioner 104 may be provided by a third party. Another of the present embodiments includes only the positioner 104, in which case the nut 102 and plungers 112 may be provided by a third party.

Figure 9:
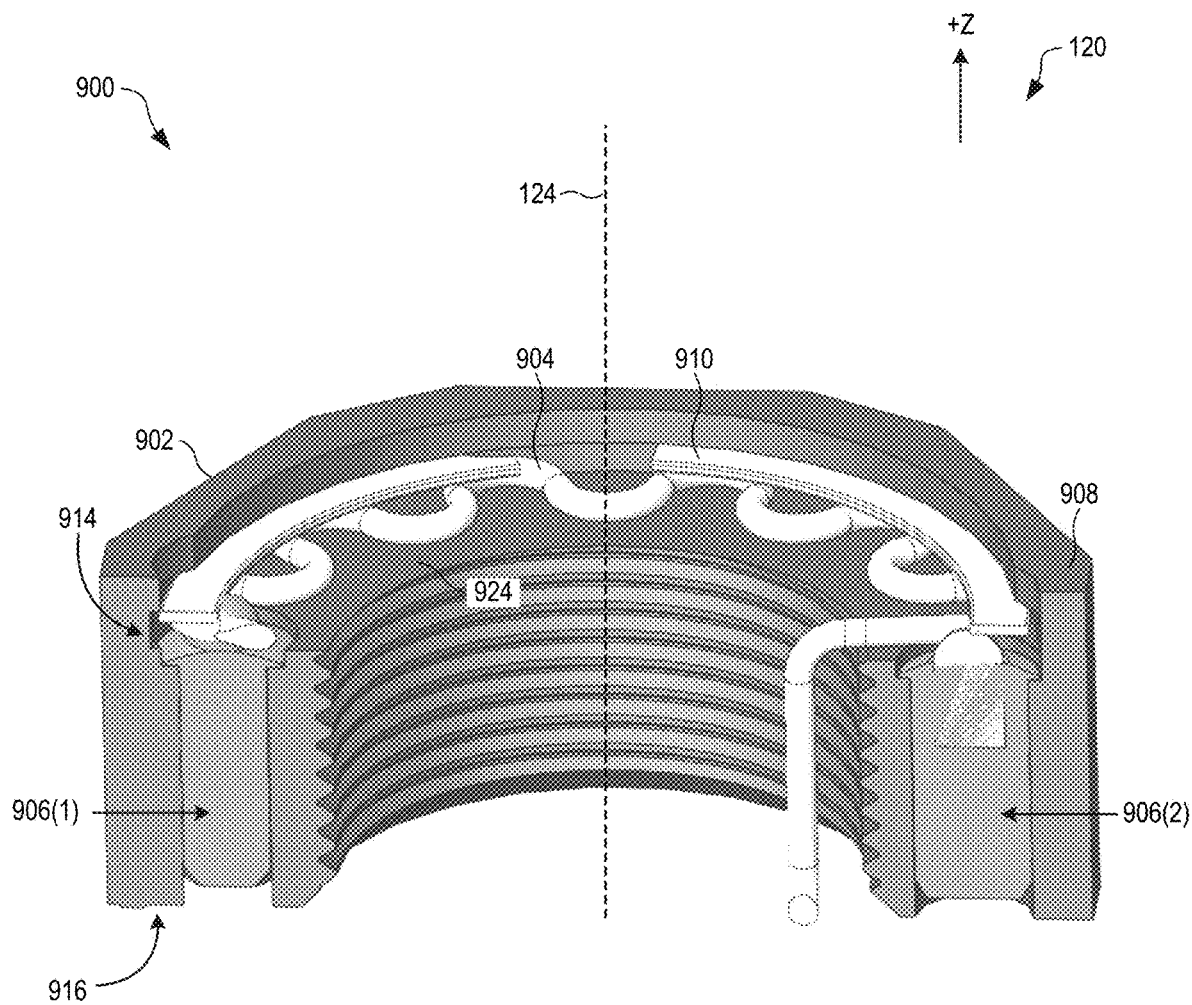
FIG. 9 is a cutaway view of a threaded fastener that is similar to the threaded fastener of FIG. 1 except that it uses a positioner shaped as an undulating wire to create a plurality of recesses, in an embodiment.

FIG. 9 is a cutaway view of a threaded fastener 900 that is similar to the threaded fastener 100 of FIGS. 1-8 except that it uses a positioner 904 shaped as an undulating wire to create a plurality of recesses. The threaded fastener 900, as compared to the threaded fastener 100, may be easier to assemble, thereby reducing cost. The threaded fastener 900 includes a nut 902 that is similar to the nut 102 of FIG. 1 except that it includes a lip 908 that extends axially upward from a top face 924 of the nut 902 and continuously surrounds the rotation axis 124. The nut 902 has a bottom face 916 that contacts the end face 110 of the spindle 108 when the fastener 900 is tightened thereon. The lip 908 forms a circumferential gap 914 that also continuously encircles the rotational axis 124 and within which at least part of the positioner 904 is placed (see FIG. 11). In one embodiment, the threaded fastener 900 includes a retaining ring 910 that is at least partially inserted into the gap 914 to axially constrain the positioner 904 relative to the top face 924.

Figure 10:
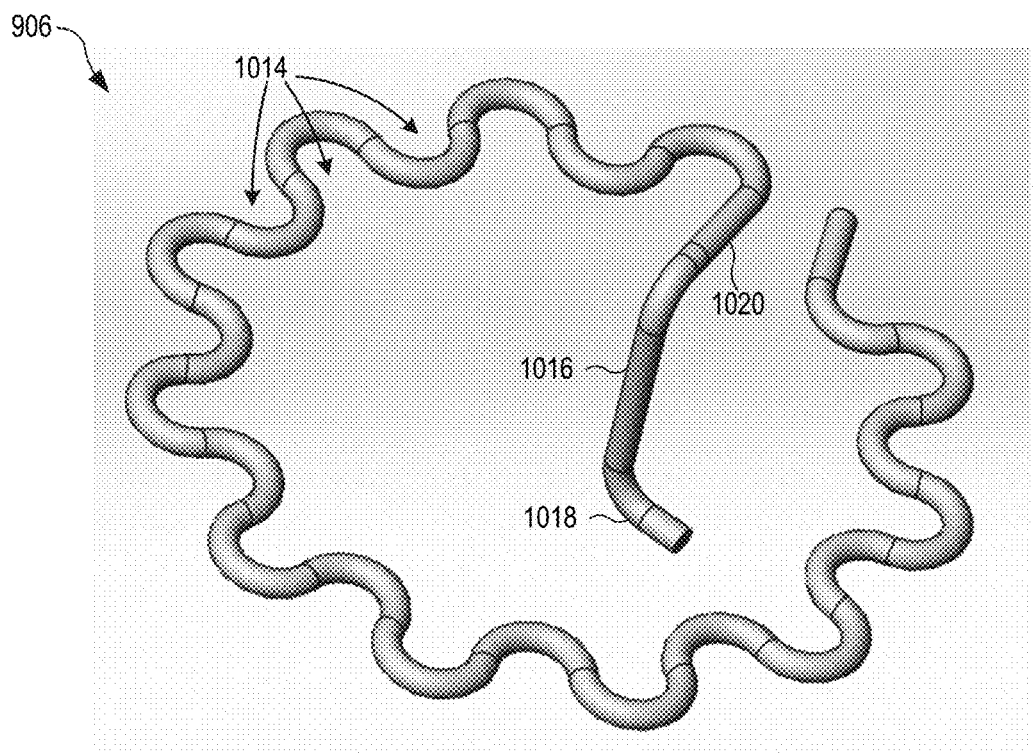
FIG. 10 shows the positioner of FIG. 9 in more detail, in an embodiment.

FIG. 10 shows the positioner 904 in more detail. The positioner 904 is a wire forming at least part of a loop encircling the rotational axis. The wire additionally forms a plurality of radial undulations that define a plurality of recesses 1014. Specifically, each radial undulation defines one of the recesses 1014. Due to the radial undulations, the recesses 1014 alternate between opening radially inward and opening radially outward. When the radial undulations are similarly sized, the recesses 1014 will be uniformly spaced about the rotation axis 124 (i.e., azimuthally in the transverse x-y plane) and all located the same radial distance from the rotation axis 124. While FIG. 10 shows the positioner 904 with 24 radial undulations forming 24 recesses 1014, the positioner 904 may be alternatively shaped with a different number of radial undulations without departing from the scope hereof.

In one embodiment, one end of the wire is bent radially inward to form a tab 1020 that engages with the vertical slot 118 of the threaded spindle 108 to rotationally constrain the positioner 904. As shown in FIG. 10, the tab 1020 may additionally include one or both of an axial leg 1016 and a transverse leg 1018 to improve how snugly the tab 1020 fits into the slot 118.

Figure 11:
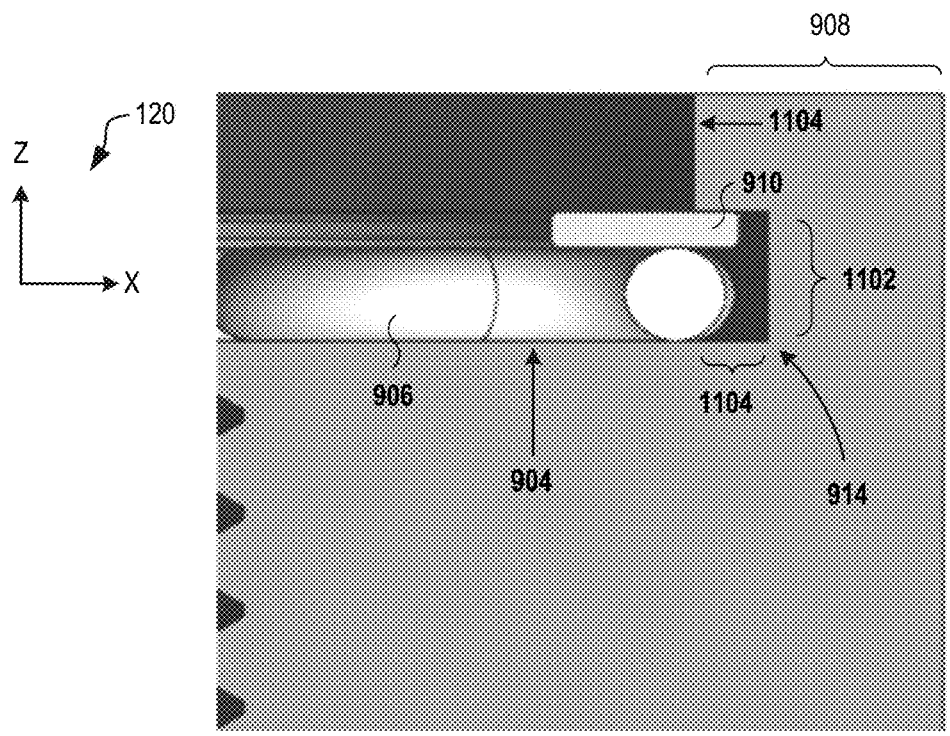
FIG. 11 is a side cutaway view of the threaded fastener of FIG. 9 that illustrates a circumferential gap in more detail, in an embodiment.

FIG. 11 is a side cutaway view of the threaded fastener 900 that illustrates the circumferential gap 914 in more detail. The circumferential gap 914 is formed radially outward from a radial inward-facing surface 1104 of the lip 908. The circumferential gap 914 has a rectangular cross section defined by a radial extent 1106 and an axial extent 1102. The top face 924 of the nut 902 forms the bottom wall of the circumferential gap 914. As can be seen in FIG. 11, at least part of the positioner 904 and retaining ring 910 are positioned inside the circumferential gap 914. The circumferential gap 914 may have a different cross-sectional shape and size than shown in FIGS. 9 and 11 without departing from the scope hereof.

The threaded fastener 900 also includes a first plunger 906(1) and a second plunger 906(2) that are similar to the first plunger 106(1) and second plunger 106(2), respectively, of FIG. 1. However, each of the plungers 906(1) and 906(2) is oriented such that its contact 218 moves axially upward to engage with the recesses 1014. The size and geometry of the circumferential gap 914 (e.g., the axial extent 1102), positioner 904 (e.g., a thickness of the wire), and retaining ring 910 (e.g., a thickness of the retaining ring 910 in the z direction) pre-load each of the plungers 906(1) and 906(2) with a pre-loading force when said each of the plungers 906(1) and 906(2) is engaged with a corresponding recess 1014. A tightening torque is the minimum torque that must applied to the nut 902 to disengage one of the plungers 906(1) and 906(2) from a recess 1014. Due to the pre-loading force, the nut 902 does not freely rotate with respect to the retaining ring 910 and positioner 904.

Since the pre-loading force and tightening torque are fixed by the geometry and configuration of the fastener 900, they do not change as the fastener 900 is threaded along the spindle 108. As a result, the fastener 900 behaves differently than the fastener 100 of FIGS. 1-8 in that the fastener 900 always clicks as it rotates, regardless of its axial position along the spindle 108. Thus, the plungers 906(1) and 906(2) are always engaging and disengaging with the recesses 1014, even when the fastener 900 is not contacting the end face 110. By contrast, the plungers 106(1) and 106(2) of the fastener 100 are not pre-loaded, and therefore the positioner 104 will be "loose" relative to the nut 102. Only when the fastener 100 approaches the end face 110 (e.g., within one turn of the nut 102) will the positioner 104 apply a force against the plungers 106(1) and 106(2) such that the plungers 106(1) and 106(2) begin to engage and disengage with the recesses 114 (i.e., produce clicks).

Another difference between the fastener 900 and the fastener 100 is that the tightening torque does not increase as the fastener 900 is tightened against the end face 110. Specifically, an increase in torque applied to the nut 902 does not result in a larger force exerted against the plungers 906(1) and 906(2), and therefore the same back-off torque can loosen the nut 902 no matter how much the nut 902 was tightened. By contrast, the fastener 100 behaves more like a conventional washer in that it transfers the tightening torque into an axial locking force that pushes the internal threads of the central hole 122 against the external threads 126 of the spindle 108. Accordingly, as the tightening torque is increased, the magnitude of this locking force also increases, as does the back-off torque needed to loosen the nut 102.

Unlike the threaded fastener 100 of FIG. 1, the recesses 1014 of the threaded fastener 900 are axially located toward the top of the nut. As a result, the plungers 906(1) and 906(2) are oriented opposite to the plungers 106(1) and 106(2). By using the bottom face 916 to contact the end face 110, as opposed to the lip 908, this orientation increases the contact surface area between the nut 902 and the end face 110. The fastener 900 can be alternatively threaded onto the spindle 108 in the opposite manner, i.e., with the lip 908 facing and contacting the end face 110. However, this alternative orientation may not always be feasible given the smaller contact area of the lip 908.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

What is claimed is:

1. A threaded fastener comprising:
a nut forming a threaded center hole that defines a rotational axis of the threaded fastener;
a plurality of spring plungers affixed to the nut, each of the plurality of spring plungers including a ball-shaped contact movable along a shaft aligned parallel to the rotational axis; and
a positioner forming (i) an unthreaded center hole that is coaxial with the threaded center hole and (ii) a plurality of recesses uniformly spaced around the rotational axis and facing the plurality of spring plungers, each of the plurality of recesses being shaped to engage with the ball-shaped contact;
wherein the plurality of spring plungers are angularly spaced about the rotational axis such that each spring plunger alternately engages with a recess and the plurality of recesses and the plurality of spring plungers cooperate to create a ball detent mechanism such that, in response to an applied torque being applied to the nut:
the ball-shaped contact of one of the plurality of spring plungers engages with one of the plurality of recesses; and
the ball-shaped contact of said one of the plurality of plungers disengages with said one of the plurality recesses when the applied torque exceeds a minimum torque.

2. The threaded fastener of claim 1, each of the plurality of spring plungers including a spring that exerts an axial force against the ball-shaped contact to push the contact against the positioner.

3. The threaded fastener of claim 1, wherein:
the nut forms a plurality of plunger mounting holes surrounding the threaded center hole; and
each of the plurality of spring plungers is inserted into a respective one of the plurality of plunger mounting holes.

4. The threaded fastener of claim 3, the plurality of plunger mounting holes being centered at the same radius from the rotational axis.

5. The threaded fastener of claim 4, the plurality of plunger mounting holes being uniformly spaced about the rotational axis.

6. The threaded fastener of claim 4, the plurality of recesses being centered at the same radius from the rotational axis.

7. The threaded fastener of claim 6, the plurality of recesses being uniformly spaced about the rotational axis.

8. The threaded fastener of claim 1, the nut being shaped as a polygon.

9. The threaded fastener of claim 8, each of the plurality of spring plungers being located at a respective corner of the nut.

10. The threaded fastener of claim 8, the polygon being a regular hexagon.

11. The threaded fastener of claim 1, wherein:
the threaded fastener further comprises a retaining ring that encircles the nut about the rotational axis;
the positioner comprises:
a disc forming the unthreaded center hole and the plurality of recesses; and
a lip extending axially upward from an outer edge of the disc and forming indentations that extend radially inward from the outer edge; and
the indentations cooperate with the retaining ring to axially constrain the positioner relative to the nut.

12. The threaded fastener of claim 11, the retaining ring comprising a flange integrally formed with the nut and extending radially outwards from outer-facing surfaces of the nut.

13. The threaded fastener of claim 11, the retaining ring comprising an annulus inserted into a plurality of notches, formed in outer-facing surfaces of the nut, that axially constrain the annulus.

14. The threaded fastener of claim 11, the disc forming a tab that engages with a slot of a threaded spindle to rotationally constrain the positioner relative to the threaded spindle.

15. The threaded fastener of claim 11, each of the plurality of recesses being one of a countersunk hole, a counterbored hole, and a straight through-hole.

16. The threaded fastener of claim 1, wherein:
the plurality of spring plungers are uniformly spaced about the rotational axis by a plunger angular spacing;
the plurality of recesses are uniformly spaced about the rotational axis by a recess angular spacing; and
the plunger angular spacing is not an integer multiple of the recess angular spacing.

17. The threaded fastener of claim 1, wherein:
the plurality of spring plungers are uniformly spaced about the rotational axis; and
the plurality of recesses are uniformly spaced about the rotational axis.

18. The threaded fastener of claim 17, wherein a number of the plurality of recesses is not an integer multiple of a number of the plurality of spring plungers.

19. A threaded fastener, comprising:
a nut forming a threaded center hole that defines a rotational axis of the threaded fastener;
a plurality of spring plungers affixed to the nut, each of the plurality of spring plungers including a shaft that is aligned parallel to the rotational axis; and
a wire forming:
at least part of a loop that encircles the rotational axis, the loop creating an unthreaded center hole that is coaxial with the threaded center hole; and
a plurality of radial undulations that create a plurality of recesses facing the plurality of spring plungers;
wherein, in response to an applied torque being applied to the nut:
one of the plurality of spring plungers engages with one of the plurality of recesses; and
said one of the plurality of recesses is shaped to disengage said one of the plurality of spring plungers when the applied torque exceeds a minimum torque.

20. The threaded fastener of claim 19, wherein:
the nut includes a lip that extends circumferentially around the threaded center hole, extends axially away from a top face of the nut, and has a radially inward-facing surface that forms a circumferential gap; and
the threaded fastener further includes a retaining ring inserted into the circumferential gap to axially constrain the wire relative to the top face of the nut.

21. The threaded fastener of claim 19, the wire having a first end extending radially inward to form a tab that engages with a slot of a threaded spindle to rotationally constrain the wire relative to the threaded spindle.

* * * * *